United States Patent [19]

Sato et al.

[11] Patent Number: 4,725,882

[45] Date of Patent: Feb. 16, 1988

[54] SCRAMBLED VIDEO SIGNAL PROCESSOR

[75] Inventors: Yoichiro Sato; Koichi Minemura, both of Fukaya, Japan

[73] Assignee: Kabushiki Kaisha Toshiba, Kawasaki, Japan

[21] Appl. No.: 912,849

[22] Filed: Sep. 29, 1986

[30] Foreign Application Priority Data

Sep. 30, 1985 [JP] Japan .................. 60-214542

[51] Int. Cl.$^4$ .............................................. H04N 7/16
[52] U.S. Cl. ....................................... 358/83; 380/10; 380/14; 380/17; 380/15
[58] Field of Search ................. 380/17, 10, 14, 15, 380/20; 358/83

[56] References Cited

U.S. PATENT DOCUMENTS

| | | | |
|---|---|---|---|
| 3,396,232 | 8/1968 | Hendrickson et al. | 380/10 X |
| 3,924,059 | 12/1975 | Horowitz | 380/17 |
| 4,075,660 | 2/1978 | Horowitz | 380/17 |
| 4,222,068 | 9/1980 | Thompson | 358/120 |
| 4,336,553 | 6/1982 | den Toonder et al. | 380/17 X |
| 4,340,906 | 7/1982 | den Toonder et al. | 380/17 |
| 4,598,318 | 7/1986 | Robbins | 380/17 |
| 4,651,205 | 3/1987 | Crowther | 380/14 |

OTHER PUBLICATIONS

DE Journal-Funkschau, 8/1985-pp. 58 to 61.

Primary Examiner—James J. Groody
Assistant Examiner—E. Anne Faris
Attorney, Agent, or Firm—Cushman, Darby & Cushman

[57] ABSTRACT

A scrambled video signal processor comprises an amplifier for outputting a noninverted video signal and an inverted video signal, a timing pulse controller for generating first and second timing pulses at a pedestal position in an arbitrary horizontal synchronous signal period of the video signal, and a third timing pulse in an arbitrary video period of the video signal, first and second pedestal clampers for receiving one of the noninverted and inverted video signals from the amplifier and clamping a pedestal level of the arbitrary horizontal synchronous signal period, an offset level controller for receiving the first timing pulse, for DC-restoring to a first level the pedestal position of the horizontal synchronous signal period of the noninverted video signal, and for DC-restoring to a second level, which is different from the first level, the pedestal position of the horizontal synchronous signal period of the inverted signal, a pedestal level controller for DC-restoring to a third level of the other pedestal position of the horizontal synchronous signal period of the inverted video signal in response to the second timing pulse, and a first switch which is switched to select one of the first and second pedestal clampers in response to the third timing pulse.

12 Claims, 12 Drawing Figures

F I G. 4A
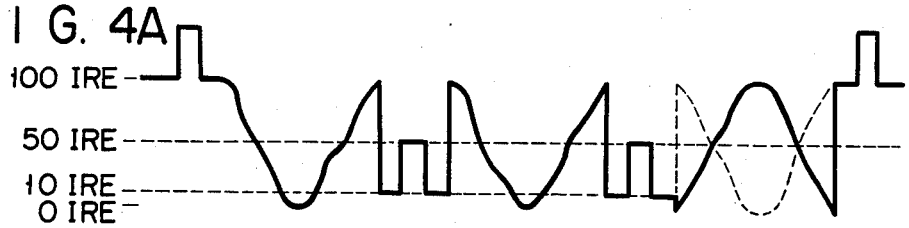
F I G. 4B
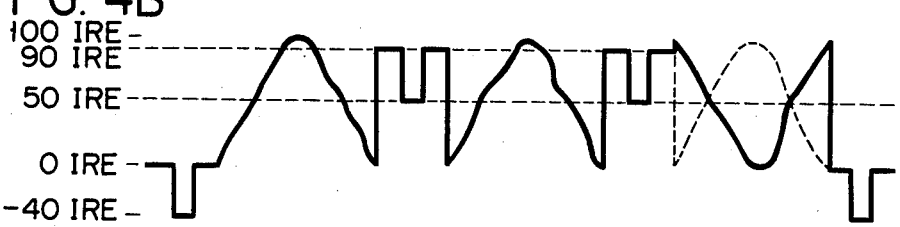
F I G. 4C
F I G. 4D
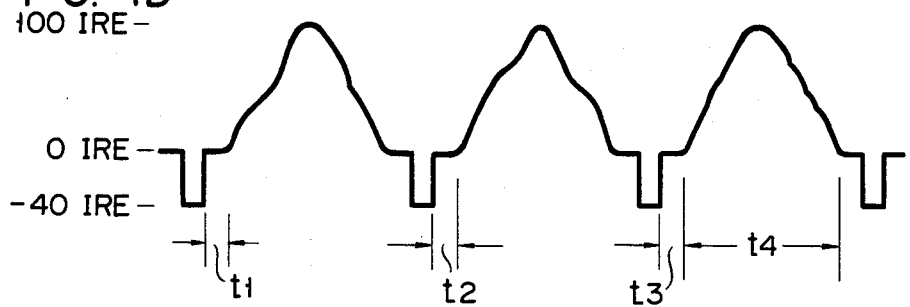
F I G. 4E
F I G. 4F
F I G. 4G
F I G. 4H

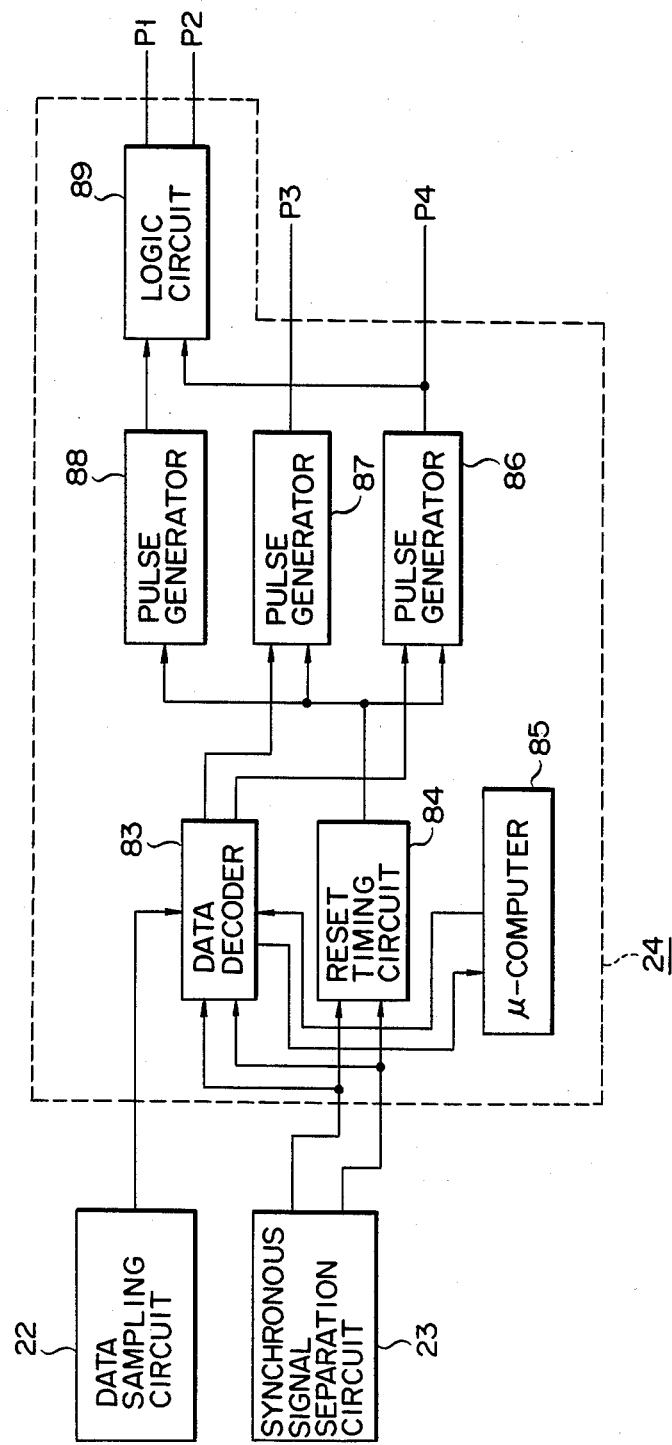
F I G. 5

SCRAMBLED VIDEO SIGNAL PROCESSOR

BACKGROUND OF THE INVENTION

The present invention relates to a scrambled video signal processor.

In a CATV system, a video signal of a "pay" channel is scrambled. The scrambled signal is unscrambled (decoded) only by subscribers who contracted to receive the "pay" channel.

The signal of a typical conventional video scrambling system of this type is illustrated in FIG. 1. Scrambling is performed after a video signal is inverted or a synchronous signal is offset, and the resultant scrambled video signal is transmitted. Reference symbol T1 in FIG. 1 denotes an inversion period of the video signal; and T2 and T3, offset periods of the synchronous signal.

In order to descramble the scrambled signal, the inversion position of the video signal or the offset position of the synchronous signal must be detected. Such position data is inserted in a vertical blanking period and is transmitted from an encoder.

FIG. 2 is a general block diagram of a system for descrambling the scrambled signal. A video signal is supplied to pedestal clamp circuit 12, data sampling circuit 15, and synchronous signal separation circuit 16 through input terminal 11. Control circuit 17 generates a data sampling timing signal on the basis of the input synchronous signal separated by separation circuit 16. This timing signal is supplied to sampling circuit 15. Sampling circuit 15 receives the data sampling timing signal, extracts various types of position data from the data sampling timing signal to control circuit 17. Control circuit 17 supplies timing signals to pedestal control circuit 18 and video signal inverter 13 on the basis of input position data. Pedestal control circuit 18 supplies a control signal to clamp circuit 12 during the pedestal period to correct the pedestal level in response to the timing signal from circuit 17. More specifically, pedestal control circuit 18 receives feedback data from video output terminal 14, determines whether the detected pedestal level is set at a desired level, and generates the control signal corresponding to the discrimination result. Circuit 18 also supplies a reference voltage to video signal inverter 13. Inverter 13 inverts (descrambles) the input video signal in the positive or negative direction with respect to the reference voltage. An inverted signal appears at output terminal 14. As shown in FIG. 1, the inversion reference of the video signal or the offset position of the synchronous signal is predetermined. As shown in FIG. 1, if a maximum amplitude level of the video signal is defined as 100 IRE, an inversion reference voltage level is 50 IRE, and a pedestal offset level is 90 IRE.

As described above, the video signal is inverted at a given level, and the pedestal level of the synchronous signal is offset, thus descrambling the video signal. The CATV system described above uses a feed back system without good follow-up characteristics. Therefore, if disturbance acts on pedestal control circuit 18 to store erroneous data therein, it takes a long period of time to stabilize the system. Control circuit 18 samples a voltage during the pedestal period to store level data in a capacitor. The stored level data is used as a control signal. If noise is mixed in during the pedestal period, an inaccurate DC level voltage is stored in the capacitor. If pedestal clamping is performed using the error data, the resultant video signal has an inaccurate DC descrambling level. As a result, the display image becomes not clear, and the occurrence of line flicker remains for a long time because a feedback system, whose response speed is generally low, is adapted to effect the descrambling.

SUMMARY OF THE INVENTION

It is an object of the present invention to provide a video signal processor for stabilizing a scrambled video signal obtained by inverting the video signal and offsetting its synchronous signal, for descrambling the stabilized scrambled video signal, and for scrambling a video signal.

According to the present invention, as shown in FIG. 3, in order to reduce the DC levels of video signals a and b having opposite polarities so that their inversion reference levels coincide, use is made of the predetermined relationships of offset levels of synchronous signals in the inverted and noninverted video signals, and clamp levels. 0 IRE clamp level is set by capacitor 57 and switch S3, and 90 IRE offset level is holded by switch S1 and capacitor 56. 10 IRE offset level is forcibly set in capacitor 51 through operational amplifier 60.

According to the present invention, the accurate inversion reference level for descrambling the scrambled video signal obtained by synchronous signal offsetting and video signal inversion can be set. In addition, the system of the present invention uses a feed forward system having a high response speed, descrambling is free from noise or the like for a long period of time, and line flicker does not occur in a video image. A system of the present invention can also be effectively used as a scrambling system.

BRIEF DESCRIPTION OF THE DRAWINGS

FIGS. 4A to 4H are timing charts showing waveforms of signals generated in the circuit of FIG. 3; and FIG. 5 is a block diagram of a control circuit shown in FIG. 3.

PREFERRED EMBODIMENT OF THE INVENTION

A preferred embodiment of the present invention will be described in detail below.

Figure 1:
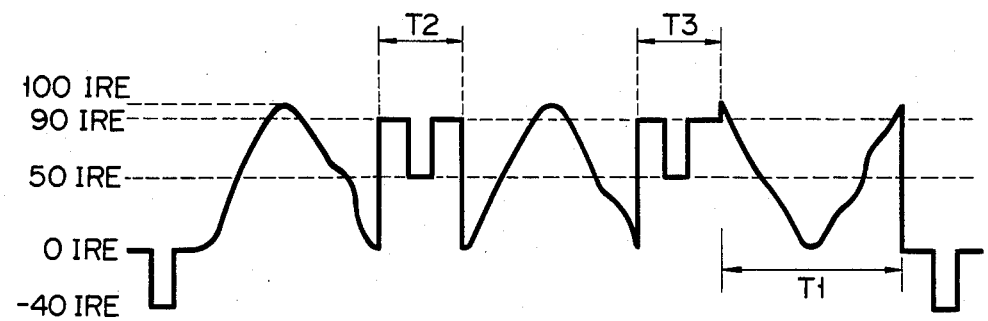
FIG. 1 (PRIOR ART) is a timing chart of a scrambled video signal.
Figure 2:
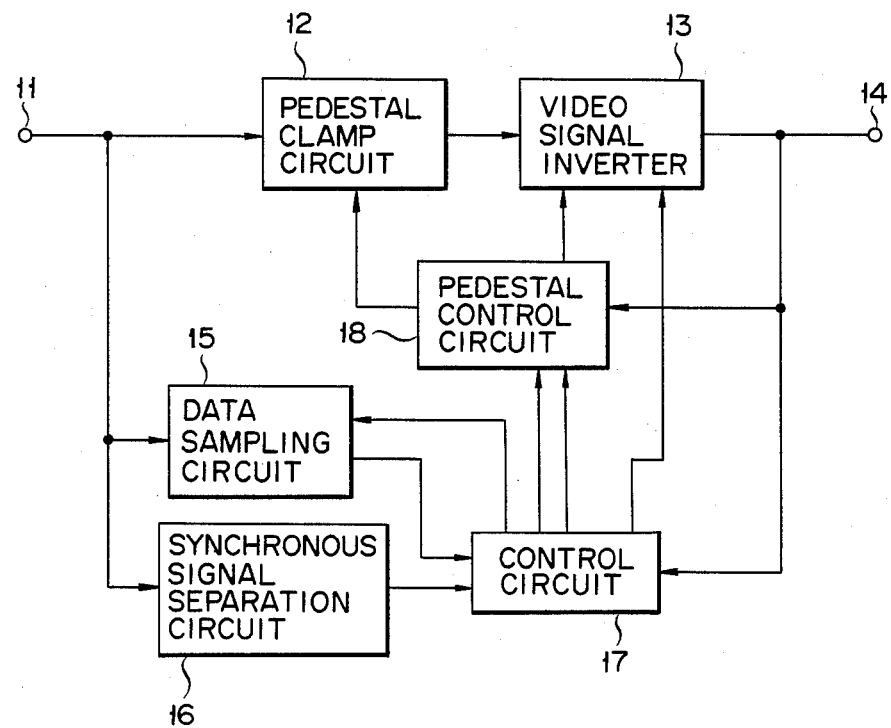
FIG. 2 (PRIOR ART) is a block diagram of a conventional descrambling circuit.
Figure 3:
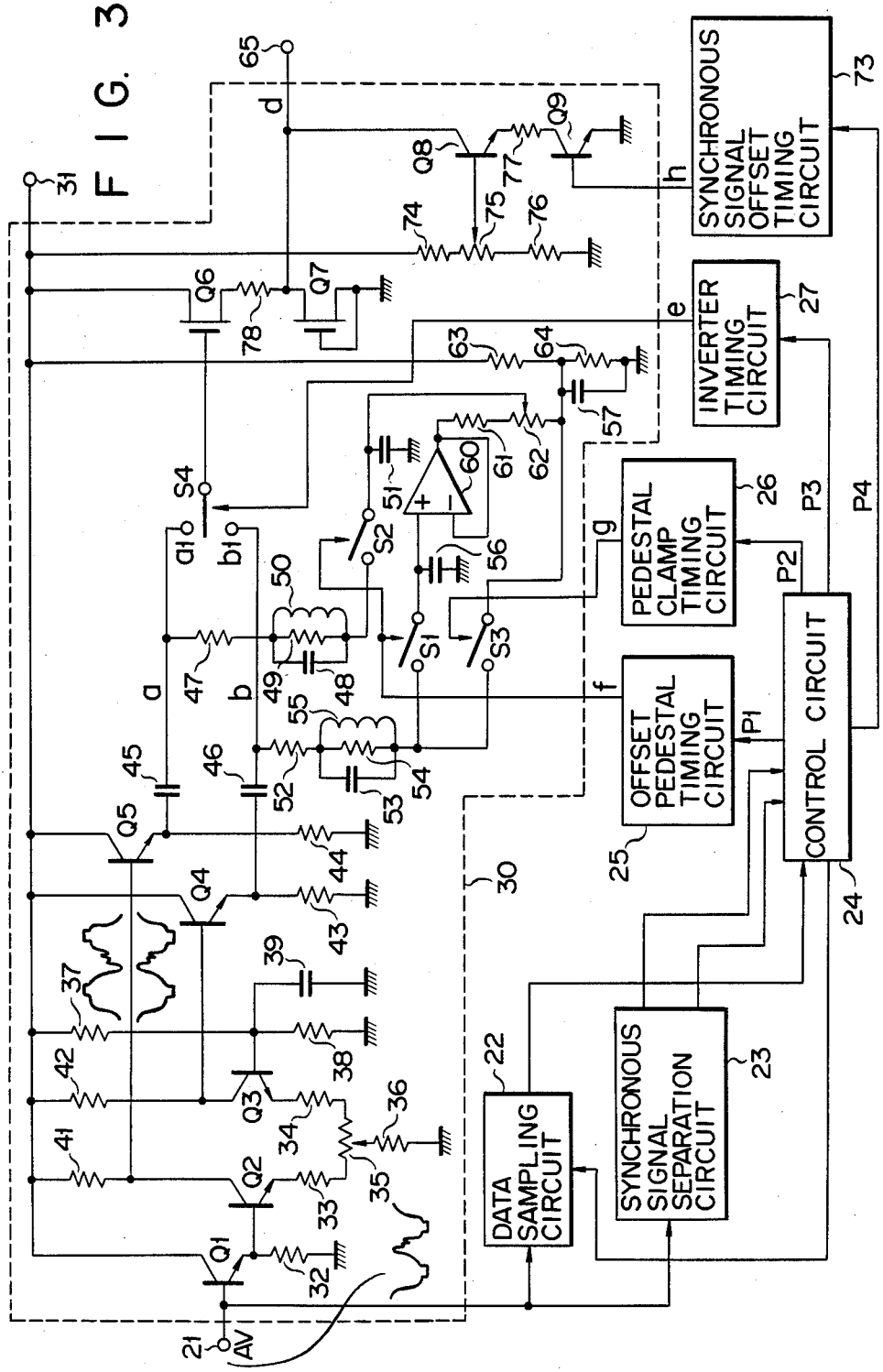
FIG. 3 is a diagram showing a scrambled video signal processor according to an embodiment of the present invention.

Referring to FIG. 3, input video signal AV scrambled in an encoder provided at a transmitting end is supplied to the base of input transistor Q1, data sampling circuit 22, and synchronous signal separation circuit 23.

Data sampling circuit 22 extracts key data inserted between horizontal synchronous pulses within the vertical blanking period of the input video signal. The key data is position data required for descrambling the scrambled video signal. The position data represents a video inversion position, a synchronous signal offset position, and the like. Synchronous signal separation circuit 23 separates the horizontal and vertical synchronous signals from the input video signal. These synchronous signals are supplied to control circuit 24. Circuit 24 generates a timing signal synchronized with position data determined on the basis of the separated synchronous signals so as to cause sampling circuit 22 to extract the position data. The position data extracted by sampling circuit 22 is supplied to control circuit 24 and utilized to generate various timing pulses.

The position data includes offset timing information, and video inversion position information. On the basis of these pieces of information and a horizontal sync pluse, control circuit 24 generates timing pulses P1, P2, P3, and P4.

Pulses P1, P2, and P3 are respectively supplied to offset pedestal timing circuit 25, pedestal clamp timing circuit 26, and inverter timing circuit 27 to drive these circuits. Timing circuit 25 drives switches S1 and S2, timing circuit 26 drives switch S3, and timing circuit 27 drives switch S4. Switches S1, S2, S3, and S4 constitute video processor 30 for descrambling the video signal.

The arrangement and operation of video processor 30 will be described below.

A power source voltage is supplied from power source terminal 31 to the collector of input transistor Q1. Video signal AV appearing at emitter resistor 32 connected to the emitter of transistor Q1 is supplied to the base of transistor Q2 constituting a differential amplifier. The emitters of transistors Q2 and Q3 are connected to both terminals of variable resistor 35 through emitter resistors 33 and 34, respectively. The sliding contact of variable resistor 35 is grounded through resistor 36 to control the balance between the right and left differential bias components. A voltage divided by resistors 37 and 38 connected in series between terminal 31 and ground is applied to the base of transistor Q3. Bypass capacitor 39 is connected between the base of transistor Q3 and ground.

Video signals having opposite phases appear at the collectors of transistors Q2 and Q3 constituting the differential amplifier. These signals are supplied to the bases of transistor Q4 and Q5, respectively. Reference numerals 41 and 42 denote load resistors of transistors Q2 and Q3. The power source voltage from power source terminal 31 is supplied to the collectors of transistors Q4 and Q5. The emitters of transistors Q4 and Q5 are grounded through emitter resistors 43 and 44 and are connected to first and second input terminals a1 and b1 of switch S4 through coupling capacitors 45 and 46, respectively.

Input terminal b1 of switch S4 is connected through resistor 52 to one terminal of a color burst trap circuit consisting of a parallel circuit of capacitor 53, resistor 54, and coil 55. The other terminal of the color burst trap circuit is connected to capacitor 56 through switch S1 and to capacitor 57 through switch S3. Capacitor 57 is charged up to a stable level of 0 IRE which is obtained by dividing the power supply voltage by resistors 63 and 64. When switch S3 is turned on, the pedestal level (0 IRE) of the video signal obtained via the burst trap (53-55), whose DC component is removed by capacitor 46, is clamped at the charged-up voltage of capacitor 57.

The 90 IRE level of the video signal, whose pedestal level is thus clamped at the 0 IRE, is sampled by the turning-on of switch S1, and the sampled 90 IRE level is held at capacitor 56. The 90 IRE level held at capacitor 56 is impedance-converted via buffer amplifier 60, and is voltage-divided by a resistor voltage divider circuit (61, 62) connected between the output terminal of amplifier 60 and capacitor 57. By this voltage-dividing, a DC level corresponding to 10 IRE is delivered from the slider of variable resistor 62 of the voltage divider circuit, and the 10 IRE level is then held at capacitor 51. Thus, the 10 IRE level is produced not only from the 90 IRE level, whose level could be varied, but also from the stable 0 IRE level. For this reason, the level of 10 IRE thus obtained is relatively stable.

Further, the above 10 IRE and 90 IRE levels are directly produced from the video signal without using a feedback circuit. Consequently, a response speed of the level production of the 10 IRE and 90 IRE levels with respect to a scrambled video signal can be made higher than that obtained when a feedback circuit is used.

Input terminal a1 of switch S4 is connected through resistor 47 to one terminal of a color burst trap circuit consisting of a parallel circuit of capacitor 48, resistor 49, and coil 50. The other terminal of the color burst trap circuit is connected to capacitor 51 through switch S2. Therefore, when switch S2 is turned on, the off-set pedestal level of the video signal from capacitor 45 is clamped at the 10 IRE level, in accordance with 10 IRE charged at capacitor 51.

In this embodiment, the circuit arrangement is designed such that charged voltages (0 IRE, 10 IRE, 90 IRE) of capacitors 51, 56, and 57 are correlated with each other.

One pedestal clamp circuit is constituted by transistor Q4, emitter resistor 43, coupling capacitor 46, resistor 52, and the color burst trap circuit of a parallel circuit consisting of capacitor 53, resistor 54, and coil 55. The other pedestal clamp circuit is constituted by transistor Q5, emitter resistor 43, coupling capacitor 45, resistor 47, and the color burst trap circuit of a parallel circuit consisting of capacitor 48, resistor 49, and coil 50.

Switches S1 and S2, operational amplifier 60, capacitors 51 and 56, and resistors 61 and 64 constitute an offset level control circuit.

Switch S3, capacitor 57, and resistors 63 and 64 constitute a pedestal level control circuit. Switch S3 is connected to condenser 53, resistor 54 and coil 55, which constitutes the color burst circuit.

As a result, in order to descramble the scrambled video signal, 0 IRE, 90 IRE and 10 IRE DC levels are relatively guaranteed.

The operation of video processor 30 will be described with reference to the signal waveforms in FIGS. 4A to 4H.

Assume that video signals a and b in FIGS. 4A and 4B appear at capacitors 45 and 46, respectively. As shown in FIG. 4D, timing pulse P2 is obtained in horizontal synchronous signal period t1 from control circuit 24. Pedestal timing circuit 26 generates signal g (FIG. 4G) in response to pulse P2. Switch S3 is turned on by signal g. Capacitor 57 is charged up to an amplitude level of 0 IRE which is obtained by dividing the power supply voltage by resistors 63 and 64. Then, during period t1, the pedestal level is clamped to the 0 IRE level charged at capacitor 57.

Timing pulse P1 is output from control circuit 24 during period t2. Offset pedestal timing circuit 25 outputs signal f (FIG. 4F) in response to pulse P1, and switches S1 and S2 are turned on so that the 90 IRE offset level is charged by capacitor 56. At the same time, the 10 IRE offset level is charged by capacitor 51. The reference voltage for video inversion is automatically set to be the 50 IRE level. The level is also determined during period t3 in the same manner as described above. During period t4 in which the video signal is to be inverted, switch S4 selects terminal a1 in response to output signal e (FIG. 4E) from circuit 27 on the basis of timing pulse P3. Therefore, the descrambled video signal is reinverted at an accurate 50 IRE position and is free from distortions.

The signal descrambled by switch S4 appears at output terminal 65 through an impedance buffer consisting of MOS transistors Q6 and Q7. In this case, the offset synchronous signal is restored to the predetermined clamp level, i,e., 0 IRE. A circuit for restoring the predetermined clamp level is constructed as follows. Namely, resistor 74, variable resistor 75 and resistor 76 forming a series circuit are connected to power source 31. The base of transistor Q8 is connected to the sliding contact of variable resistor 75, the collector of transistor Q9 is connected to the emitter of transistor Q8 through resistor 77, and resistor 78 is connected between transistors Q6 and Q7. Transistor Q9 is turned on in response to fourth signal h (FIG. 4H) on the basis of timing signal P4 from synchronous offset timing circuit 73. A current is supplied across resistor 77 while signal h is being output. The current across resistor 78 is increased by the current component across resistor 77. Thus, during the offset period, the DC level of a video signal at output terminal 65 is decreased, so that an offset synchronous signal is restored. The current across resistor 77 is determined by the base potential of transistor Q8. The base potential of transistor Q8 determines the restoration level of the offset by adjusting the resistor of variable resistor 75. More specifically, by adjusting the resistance of resistor 75, the 0 IRE DC level is restored at output terminal 65. As a result, the offset synchronous signal restores the original level, thereby obtaining completely original video signal d in FIG. 4D at output terminal 65.

In the above description, the circuit of this embodiment is exemplified as a descrambler. In addition, the concept of setting the reference voltage for inverting the video signal is effectively applicable to a scrambler.

FIG. 5 is a block diagram showing the detailed arrangement of control circuit 24 in FIG. 3. Reset timing circuit 84 generates a data sampling timing signal in response to the horizontal and vertical synchronous signals separated by synchronous signal separation circuit 23. The data sampling timing signal is output from circuit 84 to data sampling circuit 22. Circuit 22 supplies to data decoder 83 position data including offset timing information, pedestal clamp position information, and video inversion position information. The position data is decoded by data communication between decoder 83 and microcomputer 85. The position data decoded by decoder 83 and microcomputer 85 and the reset signal from timing circuit 84 are input to pulse generator 86. Generator 84 then generates timing pulse P4 (synchronous offset timing signal), pulse generator 87 generates timing pulse P3 (inversion timing signal), and pulse generator 88 generates a pedestal timing signal including the offset pedestal timing signal and the pedestal clamp signal. Logic circuit 89 receives outputs from pulse generators 86 and 88 and generates timing pulse P1 (offset pedestal timing signal) and timing pulse P2 (pedestal clamp signal).

What is claimed is:
1. A scrambled video signal processor comprising:
circuit means for receiving a scrambled video signal and outputting a noninverted video signal from a first output section thereof and an inverted video signal from a second output section thereof;
timing pulse control means for generating a first timing pulse at a pedestal position in an arbitrary horizontal synchronous signal period of the video signal, a second timing pulse at another pedestal position of the arbitrary horizontal synchronous signal period, a third timing pulse in an arbitrary video period of the video signal, and a fourth offset timing pulse;
first pedestal clamp means for receiving the noninverted video signal from said first output section in said circuit means and clamping a pedestal level of the arbitrary horizontal synchronous signal period;
second pedestal clamp means for receiving the inverted video signal from said second output section in said circuit means and clamping a pedestal level of the arbitrary horizontal synchronous signal period;
offset level control means for receiving the first timing pulse from said timing pulse control means and for DC-restoring to a first level the pedestal position of the horizontal synchronous signal period of the inverted video signal appearing at said first output section in said circuit means and for DC-restoring to a second level the pedestal position of the horizontal synchronous signal period of the noninverted signal appearing at said second output section in said circuit means, the second level being different from the first level;
pedestal level control means, connected to one of said first and second pedestal clamp means, for DC-restoring to a third level, different from the first and second levels, the other pedestal position of the horizontal synchronous signal period of the noninverted video signal in response to the second timing pulse from said timing pulse control means; and
first switching means switched to select said second pedestal clamp means in response to the third timing pulse from said timing control means, for outputting a descrambled video signal.
2. A processor according to claim 1, wherein said circuit means comprises a differential amplifier.
3. A processor according to claim 1, wherein said timing pulse control means comprises:
a control circuit for generating first, second and third control signals synchronized with a position data predetermined on the basis of horizontal and vertical synchronous signals said first, second and third control signals being output on the basis of the position data sampled by a data sampling circuit in response to the timing signals synchronized with the predetermined position data,
an offset pedestal timing circuit for receiving the first control signal and outputting the first timing pulse to said offset level control means,
a pedestal clamp timing circuit for receiving the second control signal and outputting the second timing pulse to said pedestal level control means, and
an inverter timing circuit for receiving the third control signal and outputting the third timing pulse to said first switching means.
4. A processor according to claim 1, wherein said timing pulse control means comprises:
a reset timing circuit for receiving horizontal and vertical synchronous signals from a synchronous signal separation circuit, supplying a data sampling timing signal to a data sampling circuit, and causing said data sampling circuit to supply the position data;

a decoder for receiving the position data and decoding the position data by communication with a microcomputer;

a first pulse generator for receiving the position data decoded by said decoder and said microcomputer and a reset signal from said reset timing circuit and generating a fourth timing pulse;

a second pulse generator for receiving the position data decoded by said decoder and said microcomputer and a reset signal from said reset timing circuit and generating said third timing pulse;

a third pulse generator for receiving the reset signal and generating a pedestal timing signal including an offset pedestal timing signal and a pedestal clamp signal; and a logic circuit for receiving the pedestal timing signal from said third pulse generator and the fourth timing pulse from said first pulse generator to separate and output the first and second timing pulses.

5. A processor according to claim 1, wherein said first and second pedestal clamp means each comprise:

transistors for receiving the noninverted and inverted video signals from said first and second output sections in said circuit means;

coupling capacitors inserted between said switch means and outputs of said transistors;

emitter resistors connected to emitters of said transistors; and color burst trap circuits connected to said outputs of said transistors through said coupling capacitors.

6. A processor according to claim 5, wherein said color burst trap circuits respectively comprise parallel circuits of capacitors, resistors, and coils.

7. A processor acccording to claim 1, wherein said offset level control means comprises:

second and third switching means which are turned on in response to the first timing pulse from said timing pulse control means;

a first capacitor for DC-restoring to the first level the pedestal position in the horizontal synchronous signal period of the noninverted video signal appearing at said first output section in said circuit means upon closing of said second switching means;

arithmetic means for receiving an output from said first capacitor and generating an output corresponding to the first level; and a second capacitor for DC-restoring, to the second level corresponding to the output from said arithmetic means, the pedestal position in the horizontal synchronous signal period of the inverted video signal appearing at said second output section in said circuit means upon closing of said third switching means.

8. A processor according to claim 7, wherein said arithmetic means comprises:

an operational amplifier, a noninverting input terminal of which is connected to said first capacitor and an output terminal of which is fed back to an inverting input terminal thereof; and a variable resistor inserted between the output terminal of said operational amplifier and ground, said variable resistor being provided with a sliding contact connected to said second capacitor.

9. A processor according to claim 7, wherein said pedestal level control means comprises:

fourth switching means which is turned on in response to the first control signal from said offset pedestal timing circuit; and a third capacitor for DC-restoring to the third level the noninverted or inverted video signal appearing at said first or second output section in said circuit means.

10. A processor according to claims 9, wherein said second, third, and fourth switching means comprise semiconductor elements.

11. A processor according to claim 1, wherein said first switching means comprises an analog switch.

12. A processor according to claim 3, wherein said first switching means further comprises a synchronous signal offset releasing means for restoring to a previous level the level of a synchronous signal which is obtained by offsetting the video signal output from the pedestal clamp means selected in response to a fourth timing pulse, thus outputting said descrambled video signal; and wherein said timing pulse control means further comprises a synchronous signal offset timing circuit which receives a fourth control signal output from said control circuit in synchronism with said position data, and outputs said fourth timing pulse indicative of a timing with which to offset the synchronous signal.

* * * * *